United States Patent [19]

Cailloux

[11] 4,180,801
[45] Dec. 25, 1979

[54] SYSTEM FOR SUPERVISING CONNECTION POINTS

[75] Inventor: Philippe Cailloux, Chatenay-Malabry, France

[73] Assignee: Compagnie Industrielle des Telecommunications Cit-Alcatel, Paris, France

[21] Appl. No.: 840,458

[22] Filed: Oct. 7, 1977

[30] Foreign Application Priority Data

Oct. 13, 1976 [FR] France ................. 76 30743

[51] Int. Cl.² .................. H04Q 3/00; G08B 19/00
[52] U.S. Cl. ........................... 340/147 R; 340/518
[58] Field of Search ......... 340/147 R, 147 LP, 166 R, 340/518, 519

[56] References Cited

U.S. PATENT DOCUMENTS

| | | | |
|---|---|---|---|
| 3,323,107 | 5/1967 | Duvall | 340/147 |
| 3,611,363 | 10/1971 | McCrea | 340/518 |
| 3,766,540 | 10/1973 | Schopfer et al. | 340/171 A X |
| 3,952,287 | 4/1976 | Vie | 340/518 X |
| 4,060,795 | 11/1977 | Harumiya et al. | 340/518 X |

FOREIGN PATENT DOCUMENTS 2202110 7/1973 Fed. Rep. of Germany .
2448662 5/1975 France .

OTHER PUBLICATIONS

*Telecommunication Journal*, vol. 36, XII/1969, Geneva, D. Van de Nieuwegiessen, "Argus", A Stored Programme-Controlled System for Integrated Remote Supervision and Operation of Telecommunication Equipment, pp. 672-675.
"Interrupt System for Computer"–J. J. Duvalsaint et al., *IBM Technical Disclosure Bulletin*, vol. 14, No. 8, Jan. 1972, p. 2525.
"An Addressing Scanning and Instruction System for Cascadeded Multiplexing"–R. J. Furlong et al., *IBM Technical Disclosure Bulletin*, vol. 5, No. 7, Dec. 1962, pp. 1-3.

*Primary Examiner*—Donald J. Yusko
*Attorney, Agent, or Firm*—Sughrue, Rothwell, Mion, Zinn and Macpeak

[57] ABSTRACT

The invention is characterized by the use of electronic scanners independently controlled by a control unit, said scanners cyclically scanning in an autonomous manner the matrices of the contacts which are assigned to them and the control unit cyclically observing the scanners so that when a scanner detects the change in state of a contact, the control unit collects from said scanner the geographical data of this contact and causes, during a determined time the display of the number of said contact and possibly signals the category to which it belongs. This signalling can also, according to its category, be accomplished by an acoustic alarm.

5 Claims, 3 Drawing Figures

SYSTEM FOR SUPERVISING CONNECTION POINTS

The invention relates to a system for reading electric connection points to supervise the electric connection points and to signal any change in the state of said points by displaying temporarily their identification numbers, in particular for electric contacts disposed in matrix form.

The supervision of the open or closed state of contacts generally requires a number of wires and of indicator lamps equivalent to the number of contacts to be supervised. If the number of contacts is high, as is the case in a telephone exchange for example, it is necessary to use bulky and expensive equipment, all the more so as the indicator lamp panel is often far from the contacts to be supervised.

Preferred embodiments of the reading system according to the invention allow the geographical coordinates of the connection points which signal a change in state or setting off of an alarm to be collected and displayed in turn. This temporary and successive signalling of the alarms makes it possible to reduce substantially the cost of the wiring and of the display equipment while observing and controlling effectively said alarms.

The present invention provides a system for supervising connection points and for indicating changes of state among the supervised connection points; the system comprising cyclic electronic scanners for detecting and identifying such a change of state, said scanners being independent of each other and comprising means for detecting the states of their supervised points and for marking a change of state with a drive signal which is maintained during at least one scanning cycle, the system further comprising a control unit having means for cyclically observing the scanners, means for interrupting the cyclic observation when encountering a marked change of state, means for displaying change of state at least temporarily and means for testing the drive signal of the scanner which has caused the interruption of the control unit to maintain the control unit in observation of the same scanner until the said drive signal has disappeared.

The application of the invention makes use of electronic scanners controlled independently by a control unit, said scanners scanning cyclically and in an autonomous manner the connection points which are assigned to them and the control unit observing the scanners cyclically so that when a scanner detects the change in state of a connection point, the control unit collects from said scanner the geographical data of the point and causes during a determined time, the number of said point to be displayed, and possibly indicates the category to which it belongs. This indication can also, according to its category, be accompanied by an audible alarm.

An example of a reading system embodying the invention is described hereinbelow, having no limiting character and with reference to the accompanying drawings, in which.

Figure 1:
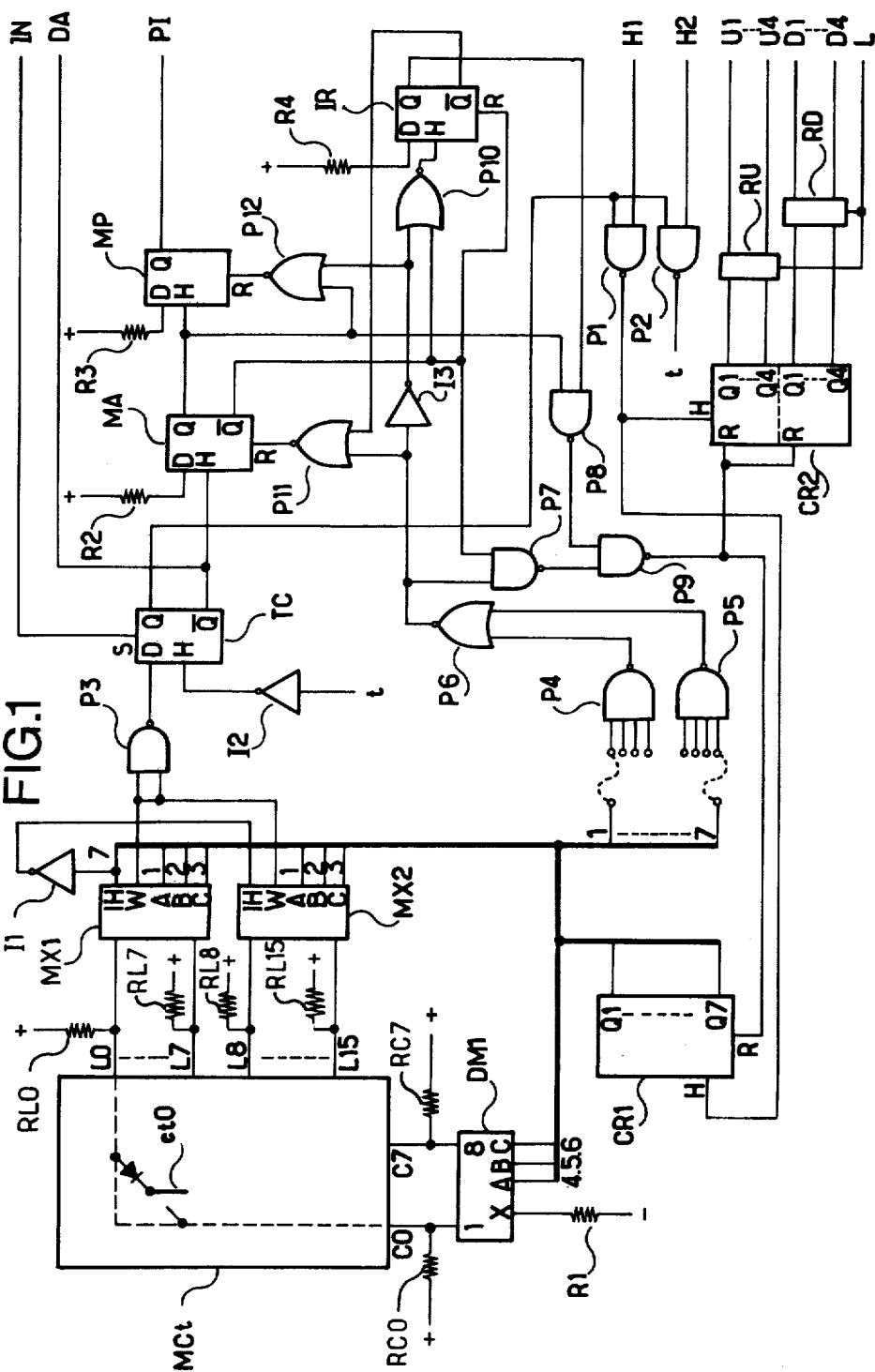
FIG. 1 shows an electronic scanner of a system embodying the invention.

The electronic scanner shown in FIG. 1 supervises a set of contacts, said contacts, such as cto, being disposed in the form of a matrix MCt having 16 rows L0 to L15 and 8 columns C0 to C7, each matrix of contacts being assigned to one scanner. The scanner comprises two counters CR1 and CR2 advancing in synchronism with clock pulses delivered by a control unit on an input H1 of a NAND gate P1.

The counter CR1 is a binary counter which selects simultaneous both the rows of the matrix via outputs Q1 to Q3 and two multiplexers MX1 and MX2, and the columns via outputs Q4 to Q6 and a demultiplexer DM1.

The counter CR2 is a binary coded decimal counter constituted by two counting circuit packages connected in series. It supplies the identification number of the contact scanned by the counter CR1 to a units register RU and a tens register RD.

The last output Q7 of the counter CR1 is connected to the inhibition input IH of the multiplexer MX1 and via an inverter I1, to the inhibition input of the multiplexer MX2. This makes it possible to block one or the other of the multiplexers according to the group of lines scanned.

The circuits used in the system are complementary MOS circuits and the flip-flops are D type.

The control unit (which will be described hereinbelow with reference to FIGS. 2 and 3) delivers a second clock signal to the electronic scanner, immediately after the first clock signal H1, on an input H2 of a NAND gate P2 whose output (wire t) is connected via an inverter I2 to the clock input H of a contact test flip-flop TC. The data input D of said flip-flop is connected to the output of an inverting gate P3 whose two inputs are connected together to the W outputs of the multiplexers MX1 and MX2.

If the scanned contact ctc is closed, the inverting gate P3 transmits a logic state 1 to the D input of the flip-flop TC (state 0 given by the negative potential of the resistor R1 transmitted via the demultiplexer DM1, the contact cto and one of the multiplexers MX). The contact test flip-flop TC is not influenced by the state 1 received on its D input and remains at its original state ($Q=1$, $\bar{Q}=0$).

If the scanned contact cto is open, the gate P3 transmits a 0 state on the D input of the flip-flop TC which passes to the 0 state ($Q=0$, $\bar{Q}=1$) on the arrival of the clock signal transmitted by H2 and P2. The gates P1 and P2 having their second inputs connected to the output Q of the flip-flop TC, become blocked, thereby preventing the scanner from taking account of the following clock signals: the counters CR1 and CR2 are thus stopped on their respective scanning step and detected open contact designating step. The 1 state of the $\bar{Q}$ output of the flip-flop TC indicates this detection to the control unit via the wire DA.

The $\bar{Q}$ output of the flip-flop TC is connected to the clock input of a flip-flop MA whose D input is connected to a positive polarity via a resistor R2. The Q output of the flip-flop MA is connected to the clock input of a flip-flop MP whose D input is connected to a positive polarity via a resistor R3 and whose Q output is connected to the control unit via a wire PI.

The outputs L0 to L15 of the rows of the matrix MCt are each connected to a positive polarity via a resistor such as RL0 for the row L0. This makes it possible for the scanner to detect the non-plugging in of the matrix card, the absence of the card being interpreted by the gate P3 as an opening of a contact.

The flip-flop TC having changed state on detection, the flip-flops MA and MP change from the state 0

(Q=0) to the state 1 (Q=1), and the flip-flop MP delivers a drive signal on the wire PI towards the control unit.

The control unit, finding a signal applied to the wire DA by the scanner, concludes therefrom that the scanner has stopped on detection and hence said control unit applies a signal to the wire L in order to empty the registers RD and RU of said scanner of their contents and to collect the identification number of the contact detected as being open. The control unit displays said number during a given time then erases the test by applying an initialisation signal on the wire IN connected to the set input S of the flip-flop TC; said signal sets said flip-flop in the 0 state which unblocks the gates P1 and P2 in order to enable the clock signals received on H1 and H2 to cause the resumption of scanning and possibly a new detection.

The outputs of the counter CR1 are connected to the inputs of two NAND gates P4, P5 so as to open said gates at the step N+1 of said counter, N being the number of contacts scanned. The gates P4 and P5 drive a NOR gate P6 which controls the resetting to zero of the counters CR1 and CR2 by a set of three NAND gates P7, P8, P9. The gate P7 is controlled by the gate P6 and by the $\overline{Q}$ output of the flip-flop MA; the gate P8 is controlled by the Q output of MA and by the Q output of a flip-flop IR. The two inputs of the gate P9, whose output is connected to the R inputs for resetting the counters CR1 and CR2 to zero, are controlled by the gates P7 and P8. The flip-flop IR has its clock input H connected to the output of a NOR gate P10 whose two inputs are connected respectively to the $\overline{Q}$ output of the flip-flop MA and to the output of the gate P6 via an inverter I3. The D input of the flip-flop IR is fed to the positive polarity via a resistor R4. The flip-flop MA is reset to zero by a NOR gate P11 controlled by the gate P6 and by the $\overline{Q}$ output of the flip-flop IR. The flip-flop MP is reset to zero via a NOR gate P12 controlled by the Q output of the flip-flop MA and by the gate P6 via the inverter I3.

The flip-flop IR is designed to memorize the fact that there has been at least one detection of an open contact (e.g. detection of an alarm) during the scanning cycle preceding the cycle in progress.

End of the cycle: no detection of an alarm during the preceding cycle and at the end of the cycle in progress.

The flip-flop TC remains in the 1 state (Q=1, $\overline{Q}$=0). The flip-flops MA, MP and IR remain in the 0 state (Q=0, $\overline{Q}$=1).

The gate P8 remains in the 1 state. At the end of the scanning cycle, i.e. at the step N=1 of the counter CR1, the gate P6 changes to the 1 state, the gate P7 changes to the 0 state and controls the change to the 1 state of the gate P9 which resets the counters CR1 and CR2 to zero. The inverter I3 has no effect on the gate P10 which remains in the 0 state as well as the flip-flop IR.

ALARM DETECTION

When an alarm (open contact) is detected, the gate P3 delivers a 1 state to the flip-flop TC which assumes the 0 state as soon as the clock pulse h2 is received on the wire H2. The flip-flops MA and MP change from the 0 state to the 1 state. After the identity of the contact has been received and this identity displayed for a period, the control unit erases the scanner test and causes the flip-flop TC to be reset to 1 by the wire IN. The flip-flops MA and MP remain in the 1 state.

END OF CYCLE AFTER DETECTION

At the end of the cycle, the gate P6 assumes the 1 state as does the gate P7; the gate P10 whose two inputs are in the 0 state also assumes the 1 state and controls the setting to the 1 state of the flip-flop IR which prepares the resetting to zero of the flip-flop MA. The gate P8 whose two inputs are at 1 assume the 0 state, which causes the gate P9 to change to the 1 state and the counters CR1 and CR2 to reset to zero. The gate P6 reassumes to 0 state and controls the resetting to zero of the flip-flop MA by means of the gate P11 which assumes the 1 state (the output $\overline{Q}$ of the flip-flop IR is in the 0 state). Since the flip-flop MA is in the 0 state, its $\overline{Q}$ output=1 and causes the resetting to zero of the flip-flop IR. The flip-flop MP remains in the 1 state and maintains the drive signal on the wire PI. It will not assume its 0 rest state again unless there is no detection during the following cycle: in that case the flip-flop MA remains in the 0 state (Q=0) and at the end of a cycle, the inverter I3 delivers the 0 state on the gate P12 which assumes the 1 state and causes the resetting to zero of the flip-flop MP.

Figure 2:
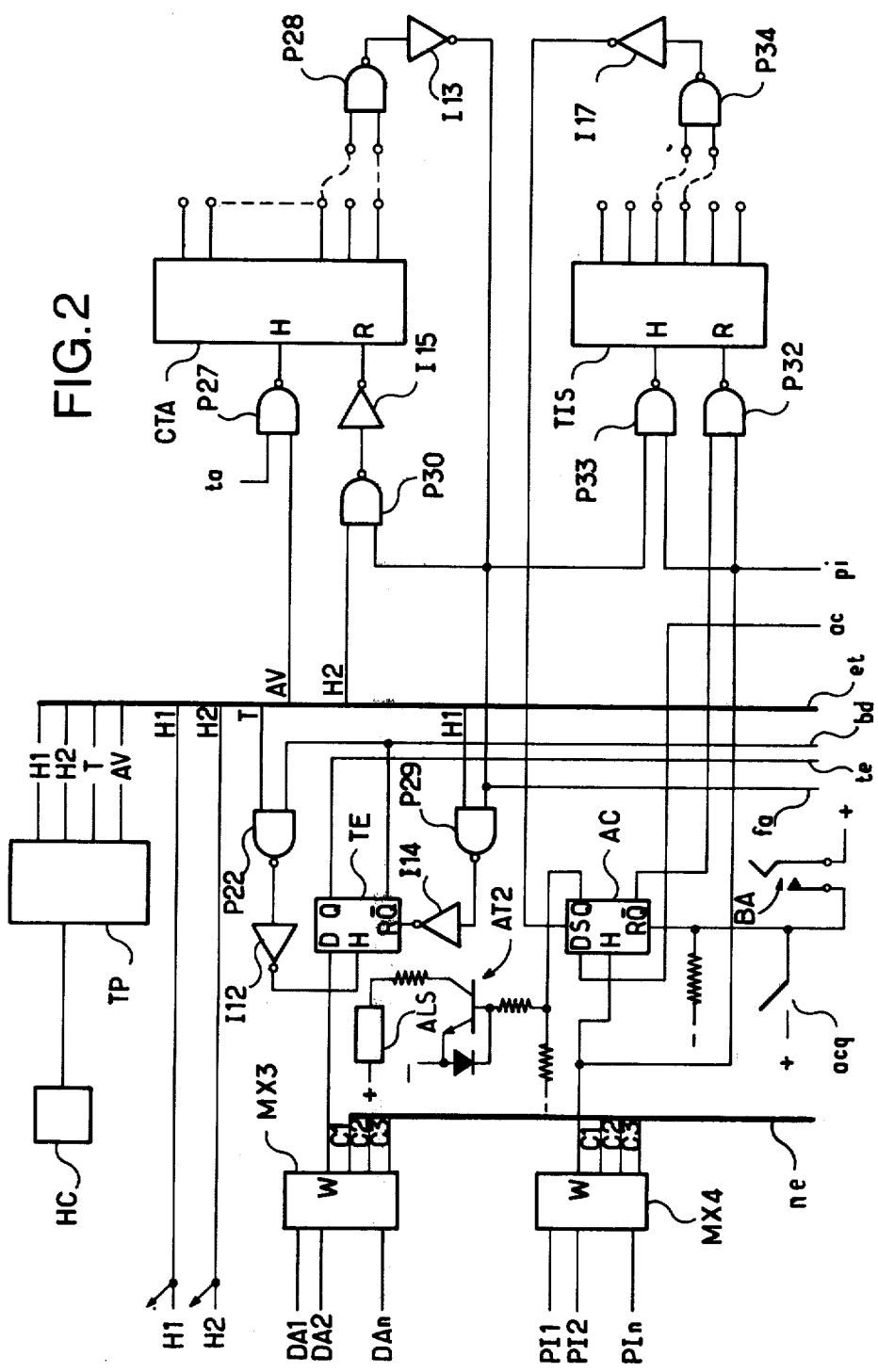
FIGS. 2 and 3 show a control and observation unit of the scanners.
Figure 3:
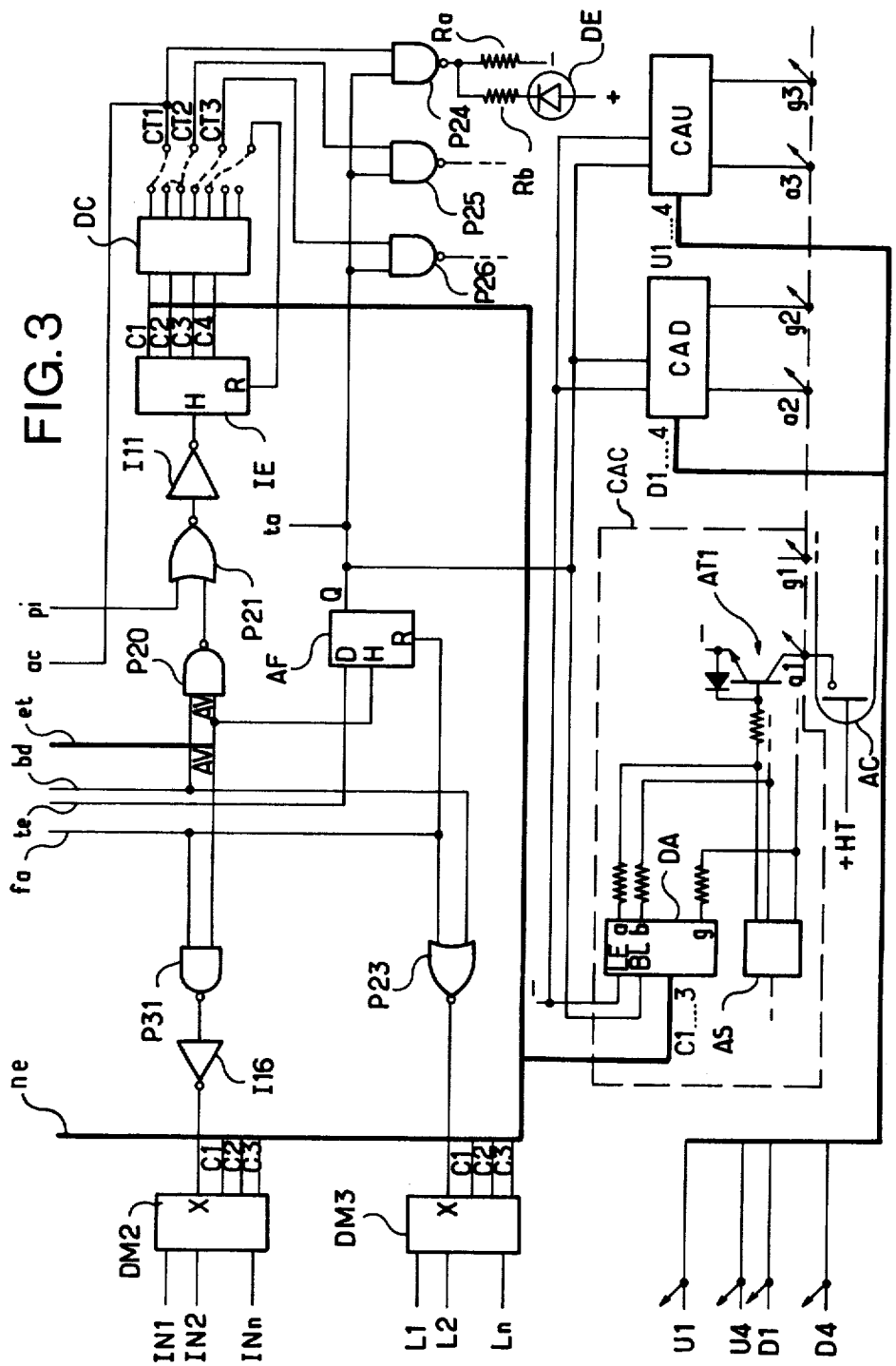

The control unit shown in FIGS. 2 and 3 is connected to a group of n scanners such as that of FIG. 1. In one embodiment, n=8. The control unit comprises a central clock HC constituted by two gates connected as an astable multivibrator. The central clock HC controls a sequencer TP which distributes the signals coming from said clock in four cyclic sequences of time signals h1, h2, t and av which are distributed respectively on the wires H1, H2, T and AV. In the following text, said sequences will be designated by said correspondng wires preceded by the letter S. These four sequences are defined as follows:

S.H1—Distribution to the scanners of the signal h1 enabling the advance of the counters CR1 and CR2 of said scanners.

S.H2—Distribution to the scanners of the signal h2 enabling said scanners to carry out, each on its own behalf, the test of a scanned contact.

S.T—Test by the signal t of the scanner designated by the control unit.

S.AV—Advance by the signal av:

either of a scanner indicator counter IE (FIG. 3), if there is no display in progress of the co-ordinates of a contact which has been detected open;

or of a counter CTA (FIG. 2) which sets the display time if display is in progress.

The wires H1 and H2 of the control unit are respectively multipled on the wires H1 and H2 of each scanner.

The output AV of the sequencer TP controls the clock input H of the scanner indicator IE by means of a NAND gate P20, a NOR gate P21 and an inverter I11. The indicator IE is a binary counter having 7 stages whose outputs C1 to C4 of the first four stages are used only. These outputs are connected to a binary coded decimal decoder DC which determines the category of the alarm or of the signal detected, as a function of theidentity of the scanner observed, one or several scanners being assigned to the detection of alarms or indications of a determined category. Thus for example the contacts indicating alarms or operations belonging to a priority category, i.e. requiring an immediate or urgent intervention will be grouped in a matrix MCt and scanned by a scanner, the number of said scanner corresponding to a priority classification of the alarm called the first category (CT1). The contacts indicating alarms or operations belonging to a non-priority category (non-urgent alarms) will be observed by one or several scanners whose number corresponds to a classification called the second category (CT2). Lastly, the contacts indicating operations of lesser importance will be observed by scanners whose numbers are assigned to a classification called the third category (CT3). The category, as a function of the number of the scanner selected is determined by suitable strapping of the outputs of the decoder DC on the connection terminals CT1, CT2 and CT3.

The outputs C1 to C3 of the counter IE are connected (wire ne):

to a multiplexer MX3 whose inputs DA1 to DAn are connected respectively to the alarm detection wire DA of the scanners 1 to n:

to a multiplexer MX4 whose inputs PI1 to PIn are connected respectively to the alarm drive wire PI of the scanners 1 to n;

to a demultiplexer DM2 whose outputs IN1 to INn are connected respectively to the initialisation wire IN of the scanners 1 to n;

to a demultiplexer DM3 whose outputs L1 to Ln are connected respectively to the control wire for transfer of the identification data contact to be indicated, stored in the registers of the scanners 1 to n;

to a binary coded decimal decoder DA of a display circuit CAC for a segment display AS. Each output of said decoder is connected to an input of corresponding order of the display AS and to the basic circuit of a transistor amplifier AT1 whose emitter is connected to the negative supply polarity of the electronic circuits and whose collector is connected to the anode of a cathode tube with a cold cathode constituting a display AC, said cathode being fed with the positive polarity +HT of a high voltage source. Several displays AC can thus be connected in parallel and at a distance to the amplifiers AT1 of the display device CAC. The capacity of the matrix MCt is 100 contacts and the displays AS and AC therefore display directly the hundred to which the detected contact belongs.

Display devices CAD and CAU display in an analogous manner respectively the tens and the units received in binary form from a scanner D1 to D4 and U1 to U4.

The output W of the multiplexer MX3 is connected to the data input D of a flip flop TE which tests the scanners. The Q output of said flip-flop is connected (wire te) to the data input D of a flip-flop AF. The $\overline{Q}$ output of the flip-flop TE is connected to the input of a NAND gate P22 controlled by the test sequence ST of the sequencer TP. The gate P22 controls the clock input H of the flip-flop TE via an inverter I12. At each sequence ST a scanner is tested provided there is no display in progress; the wire DA of the scanner designated by the scanner indicator IE being applied to the D input of the flip-flop TE, this flip-flop changes to the 1 state if the scanner has detected an open contact. The $\overline{Q}$ output of the flip-flop TE, records a scanner test and opens the scanner registers (via a NOR gate P23 wire bd and an output L of the demultiplexer DM3, thereby applying the geographical data of the contact (units and tens) on the wires U1 to U4 and D1 to D4. The clock input H of the flip-flop AF is connected (wire et) to the output AV of the sequential TP.

The Q output of the flip-flop AF is connected:

to the input BL of the decoder DA of the circuits CAC, CAD, CAU, said activated input allowing the taking into account of the data such as C1 to C3, D1 to D4 and U1 to U4;

as a common point to an input of the NAND gates P24, P25, P26 and the output of each of said gates being connected firstly to a resistor Ra connected to the negative polarity and to a register Rb in series with a light-emitting diode De whose anode is connected to the positive supply polarity;

to an advance gate P27 (wire ta) controlled by the signal AV, the output of said gate being connected to the clock input of the counter CTA. Two of the three last outputs of said counter are connected to the two inputs of a NAND gate P28 which becomes unblocked on a determined step of the counter CTA i.e. after a time delay of several seconds (e.g. 5 seconds) and controls via an inverter I13;

during the sequence S.H1, the resetting to zero of the flip-flop TE via a NAND gate P29 and an inverter T14;

- during the sequence S.H2, the resetting of the counter CTA to zero via a NAND gate P30 and an inverter I15;

during the sequence S.AV, the resetting to 1 of the flip-flop TC of the scanner via a NAND gate P31, an inverter I16 of an output IN of the demultiplexer DM2.

The output of the inverter I13 is also connected to the input R for resetting the flip-flop AF to zero which turns the displays off at the end of the cycle of the counter CTA.

The output W of the multiplexer MX 4 is connected to the clock input H of a category alarm flip-flop AC whose Q output is connected to the base circuit of an NPN transistor amplifier AT2, the collector of said transistor being connected, via a resistor to an acoustic alarm control relay AL5 connected to a positive polarity. The $\overline{Q}$ output of the flip-flop AC is connected to a first input of a NAND gate P32 whose output is connected to the resetting to zero input R a binary counter TIS whose cycle determines the period of silence between two periods of sound after acknowledgement of the first. Said acknowledgement is either local by a pressure exerted manually on an acknowledgement knob BA which connects a positive polarity on the R input for resetting the flip-flop AC to zero or at a distance via a contact acq of an acknowledgement relay, not shown. The output W of the multiplexer MX4 is also connected to a second input of the gates P32 and P21 (wires pi) and to a first input of a NAND gate P33 a second input of which is connected to the output of the inverter I13. The output of the gate P33 is connected to the clock input H of the counter TIS. Two outputs of said counter are connected by construction to the two inputs of a NAND gate P34 whose output is connected via an inverter I17 to the input S of the flip-flop AC.

No detection of an open contact during the cycle of the scanner designated by the control unit.

In this case and if no display is in progress, the sequence S.AV controls the advance by one step of the counter IE which designates a scanner of following order and the control unit is connected thereto by its multiplexer-demultiplexers MX3, MX4, DM2, DM3 (wires DA, PI, IN, L)..

Indeed, no contact being open, the wire DA of the explorer scanned by the control unit is not marked with the 1 state and the flip-flop TE remains in the 0 state ($Q=0$, $\overline{Q}=1$). The $\overline{Q}$ output of said flip-flop makes a first input of the gate P20 in the 1 state and when the sequence S.AV appears the gate 20 passes to the 0 state. The driving wire PI of the scanner also not being in the 1 state, the output W of the multiplexer MX4 marks the wire pi with the 0 state. The gate P21 whose two inputs ae at 0 assumes the 1 state and delivers via the inverter I11 an order for progress by one step to the counter IE. The scanners whose tests of the matrix contacts are negative continue their scanning of the contacts at the rate of the sequences S.H1 and test said contacts at the rate of the sequences S.H2 of the sequencer TP.

Detection of the opening of a matrix contact by a scanner.

A scanner whose order is 2 for example, having found an open contact, stops its progress and applies a permanent logic 1 state to the wires DA2 and PI2 of the control unit. This 1 state is applied to the D input of the flip-flop TE. The sequence S.T changes the flip-flop TE from the 0 state to the 1 state (Q=1) via the gate P22 which then remains blocked to the following sequences of S.T ($\bar{Q}$=0). The flip-flop TE blocks, by its output Q=0 the gate 20 during the sequence S.AV, thus preventing the scanner indicator IE from advancing which continues to designate the scanner being tested. The 1 state of the Q output of the flip-flop TE being applied (wire te) to the D input of the flip-flop AF, the frequency S.AV sets said flip-flop to 1 and unblocks the gate P27 which controls the advance of the display time counter CTA on the following step. As long as said counter is not at the end of the cycle, the gate P28 remains blocked, the inverter I13 remains in the 0 state and prevents the gates P29 and P30 from opening during the sequences S.H1 and S.H2. The gate P23 controlled by the inverter I13 in the 0 state (wire fa) opens on an order from the $\bar{Q}$=0 output of the flip-flop TE (wire bd) and delivers an order, via the demultiplexer DM3 on the wire L of the selected scanner. Said order applies the units and tens identification data of the contact on the wires U1 to U4 and D1 to D4.

The flip-flop AF in the 1 state controls the inputting of the tens and units data into the decoder DA of the circuits CAD and CAU and their display on the segment displays AS and the cathode displays AC. The scanning number designated by the counter IE corresponds to the hundreds of the identified contact (100-contact matrix assigned to the scanner) and is displayed by the hundreds display circuit CAC.

END OF THE DISPLAY CYCLE

At the end of the display cycle, the inverter I3 changes to the 1 state and controls the resetting to zero of the flip-flop AF (wire d) which turns out the displays. On the appearance of the sequence S.H1 the gate P29 opens and controls the resetting to zero of the flip-flop TF. On the appearance of the sequence S.AV, the gate P31 opens and controls via the demultiplexer DM2 and the wire IN of the scanner observed, the erasing of thetestof the contact (resetting to 1 of the flip-flop TC of the scanner). At the following sequence S.H1 the scanner then designates the contact of following order. According to the construction connecting two of the last outputs of the counter CTA to the two inputs of the gate 28, the duration of the display cycle lies between 4 and 6 seconds for example.

CASE OF A PRIORITY CATEGORY

When the scanner indicator designates a scanner assigned to priority supervision of a matrix of contacts, the decoder DC marks the terminal CT1 which corresponds to said category and lights the corresponding light-emitting diode DE. The terminal CT1 is connected (wire ac) to the data input D of the flip-flop AC so that on the appearance of the drive signal on a wire PI indicating the test of a contact effected by a scanner (the designation of the category effected at the sequence S.AV compulsorily precedes the drive signal delivered at the sequence SH2) the category alarm flip-flop AC changes from the 0 state to the 1 state and causes the relay AS to rise which triggers an acoustic alarm. The gate 32 changes from the 0 state to the 1 state on an order from the $\bar{Q}$ output of AC and positions the counter of a silence period TIS on step 0. The operator having observed the co-ordinates of the contact designated by the displays, suppresses the acoustic alarm by actuating the acknowledgement knob BA which resets the flip-flop AC to 0.

At the end of the display cycle, the inverter I13 delivers a 1 state signal to the gate P33 which changes from the 1 state to the 0 state and controls the progress of the counter TIS to the following step. The gate P21 remaining blocked by the test drive signal by the scanner (output W of MX4 in the 1 state, wire pi) the counter IE cannot progress to the following step and remains blocked on the scanner supervising the priority category contacts. In the embodiment shown two of the outputs of the counter of the silence period TIS are connected to the two inputs of the gate P34 so as to obtain a cycle duration of said counter of about two minutes. At the end of the cycle of the counter TIS the gate P34 opens and resets to the 1 state the flip-flop AC whose output $\bar{Q}$=0 resets the counter TIS to the zero step via the gate 32. The relay AS comes again into the work position and again triggers the acoustic alarm. If the test drive signal subsists (1 state applied by the scanner to the wire PI), there is again obtained a continuous acoustic alarm interrupted by the acknowledgement action and followed by two minutes' silence, triggering of the continuous acoustic alarm and so on.

If the test drive signal disappears the output W of the multiplexer MX4 coming to the 0 state blocks firstly the gate P33 which prohibits the progress of the counter TIS and secondly unblocks the gate P21 which allows the counter IE to progress to the following step and hence to designate the scanner of the following order. The flip-flop AC returns to the 0 state by acknowledgement of the operator and the acoustic alarm stops.

What we claim is:

1. A system for supervising connection points and for indicating changes of state among the supervised connection points; the system comprising cyclic electronic scanners, each scanner scanning a field of connection points for detecting and identifying such a change of state, and comprising means for detecting the states of their supervised points and means for making a change of state with a drive signal which is maintained until the occurrence of at least one scanning cycle without detection of any change of state in said field of connection points, the system further comprising a control unit having means for cyclically observing the scanners, means for stopping the cyclic observation when encountering a marked change of state, means for displaying change of state at least temporarily and means for testing the drive signal of the scanner which has caused the interruption of the control unit to maintain the control unit in observation on the same scanner until the said drive signal has disappeared.

2. A connection pont supervising system according to claim 1, wherein a category corresponding to a degree of priority is allocated to each field of connection points, each scanner being connected to scan points of one category only, and the control unit comprising means for marking and displaying the category, and means for generating an audible alarm signal when said category is of high priority.

3. A connection point supervising system according to claim 1, wherein the connection points are arranged in a matrix and wherein each scanner supervising a matrix of connection points includes two counters being driven by clock pulses, said counters selecting respectively the row and the column of the scanned point of the matrix.

4. A connection point supervising system according to claim 1, wherein a link is provided between each scanner and the control unit for transmitting to said control unit the number of the points of said field of connection points on which an alarm has been detected and wherein the control unit includes a counter for successive addressing and identification of the scanners, the addressing being performed by two multiplexers respectively for receiving change of state signals and drive signals and by two demultiplexers for sending instructions to read the point number of the detected point for display and for sending instructions for restarting scanning once the point number is displayed.

5. A connection point supervising system according to claim 2, wherein the display means include a counter triggered by the detection signal, said counter controlling the duration of the display and the audible alarm signal, if any, and wherein the control unit has a delay counter triggered at the end of a temporary display and possible audible alarm signal if the detection signal is still present at that time, said delay counter insuring the repetition of said display and possible audible alarm signal after a predetermined time delay if said detection signal is still present at the end of the time delay.

* * * * *